United States Patent [19]

Calvignac et al.

[11] Patent Number: 4,504,901
[45] Date of Patent: Mar. 12, 1985

[54] COMMUNICATION LINE ADAPTER FOR USE WITH A COMMUNICATIONS CONTROLLER

[75] Inventors: Jean L. Calvignac, La Gaude; Rene R. Castel, Vence, both of France

[73] Assignee: International Business Machines Corporation, Armonk, N.Y.

[21] Appl. No.: 300,846

[22] Filed: Sep. 10, 1981

[30] Foreign Application Priority Data

Sep. 26, 1980 [EP] European Pat. Off. ........ 80430018.4

[51] Int. Cl.³ .............................................. G06F 3/04
[52] U.S. Cl. ................................................... 364/200
[58] Field of Search ............................... 364/200, 900

[56] References Cited

U.S. PATENT DOCUMENTS

| | | | |
|---|---|---|---|
| 3,434,117 | 3/1969 | Gibson et al. | 364/900 |
| 3,648,252 | 3/1972 | Thron et al. | 364/200 |
| 3,735,357 | 5/1973 | Maholick et al. | 364/200 |
| 4,028,668 | 6/1977 | Riikonen | 364/200 |
| 4,133,030 | 1/1979 | Huettner et al. | 364/200 |
| 4,188,665 | 2/1980 | Nagel et al. | 364/200 |
| 4,246,637 | 1/1981 | Brown et al. | 364/200 |

Primary Examiner—James D. Thomas
Assistant Examiner—David L. Clark
Attorney, Agent, or Firm—Gerald R. Woods

[57] ABSTRACT

A line adapter for permitting the transfer of information between terminals and a bus connected to the central control unit CCU of a communications controller. The line adapter includes a microprocessor associated with a control memory and a scanner. A random access memory is split into zones, one zone being assigned to each line. During an initiating phase, the zones are personalized under the control of the microcode by sending initiating parameters (which are characteristics of the lines) to the memory, through an asynchronous path bus and external registers. Exchanges of temporarily-stored data between the CCU bus and the lines are carried out through cycle steal operations between the control memory and the random access memory.

10 Claims, 8 Drawing Figures

COMMUNICATION LINE ADAPTER FOR USE WITH A COMMUNICATIONS CONTROLLER

TECHNICAL FIELD

This invention concerns a communication line adapter for use with a communications controller, which can satisfactorily cope with various communication protocols, which govern both the transmission of data on the lines and the different possible transmission speeds.

Communications controllers are devices which are incorporated into data processing systems to handle communications over the various lines which are connected to the system. In many facilities, the main control of a teleprocessing network is provided by one or more central processing units (CPU) having therein a list of the data processing rules for processing the data coming from or going to the terminals of the network. Both transmission and reception of the data are processed by communications controllers controlled by the CPU. Besides the transmission/reception functions, the controller is responsible for fulfilling other functions of the list, most particularly, those functions which are directly relevant to the standard communications procedures. As a result, a CPU can be released from those tasks and can carry out other operations.

The communications controller is a complex, intelligent apparatus having most of its intelligence contained in one or more central control units (CCU). These central control units are connected to the terminals through line adapters as well as to the central processing units through channel adapters.

The line adapters can service a number of transmission lines by means of a cyclic scanning device (or scanner) and an assembly of random access memories which serve as temporary storage for data received from or to be sent over the different lines under the control of the scanning device.

In such an environnement, each line adapter can be connected to lines which send and receive information from terminals of different types and, therefore, the data transmission speeds and protocols are different. For maximum flexibility in a data communication network, the different lines should be able to accommodate all possible transmission protocols.

In one type of prior art system, each line is associated with a specific adapter circuit, the details of which depend on the protocol governing the transmission of the data on this line. It is obvious that this solution is expensive and not very flexible because, when the configuration of the network has to be changed, the adapter circuits must be changed.

Another solution consists in handling the data communication protocols by means of a microprogram only. Such a solution offers a very flexible network but is still not totally satisfactory. Some functions require a far longer time to be performed through a microprogram than through an appropriate circuit. Consequently, total reliance on a microprogram is not always compatible with high performance.

SUMMARY OF THE INVENTION

Therefore, one object of this invention is to provide a line adapter circuit with which it is possible to obtain a teleprocessing network of maximum flexibility.

Another object of this invention is to provide an adapter circuit with which it is possible to maintain high processing speed.

According to this invention, each line adapter is split into two parts. The first part is organized around a microprocessor and an assembly of memories. The microprocessor is in charge of handling the data sent by the central control unit CCU over the lines, via the scanner circuits into the second part, and vice versa. The memory assembly acts as a buffer between the central control unit and the scanner.

The second part is organized around the scanner and makes it possible to control the communication lines. Such a part receives or transmits the data over the line, via a modem for remote control lines, and an interface circuit. The scanner is comprised of means for deserializing the received data and serializing the data to be transmitted. In such a scanner, the data is stored in a random access memory. The line scanning operation is carried out by cyclically scanning the memory positions under the control of an address selection device.

Information is exchanged between the memories of the scanner and the microprocessor via the external register of the microprocessor and through cycle steal operations directly with a control memory of the microprocessor.

The interface between the two parts is comprised of three exchange paths. The first input-output path is an asynchronous path essentially utilized during the initializing mode in order to personalize the memories of the scanner, under the control of the microcode with respect to the line characteristics. A second path is utilized to accomplish the interrupt requests, and a third path is utilized to exchange data through cycle steal operations between the memories of the scanner and the control memory of the microprocessor, under the control of the scanner.

A preferred embodiment of the invention will be further described with reference to the accompanying drawings.

PREFERRED EMBODIMENT OF THE INVENTION

Figure 1:
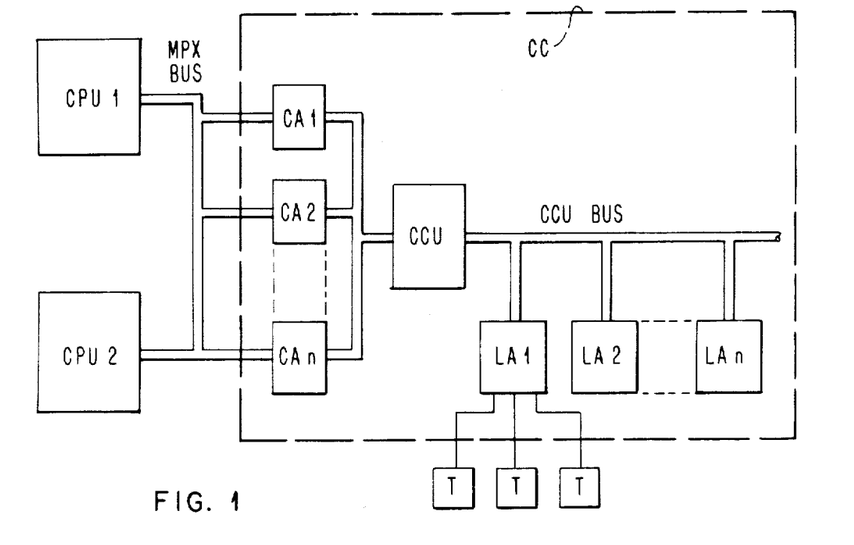
FIG. 1 is a schematic block diagram of a system wherein the invention may be used.

FIG. 1 illustrates a global scheme of a system which can use this invention. Communication Controller CC is an element of a teleprocessing network of a type disclosed in the book "Teleinformatique", by G. Macchi and J. E. Guilbert, 1979, published by Dunod, more specifically, under chapter 10. In the communications controller, a central control unit CCU handles the data transmitted between terminals T and central processing units CPU1 and CPU2. Unit CCU is connected to multiplex channel (MPX) buses for the central processing units CPU1 and CPU2 via channel adapters CA1, ... CAn. It is also coupled to terminals T via line adapters LA1, ..., LAn connected to a CCU bus.

This invention concerns the line adapters, which are modular; i.e., the same adapter can be utilized whatever the transmission speeds and protocols on the lines to which it is connected.

Figure 2:
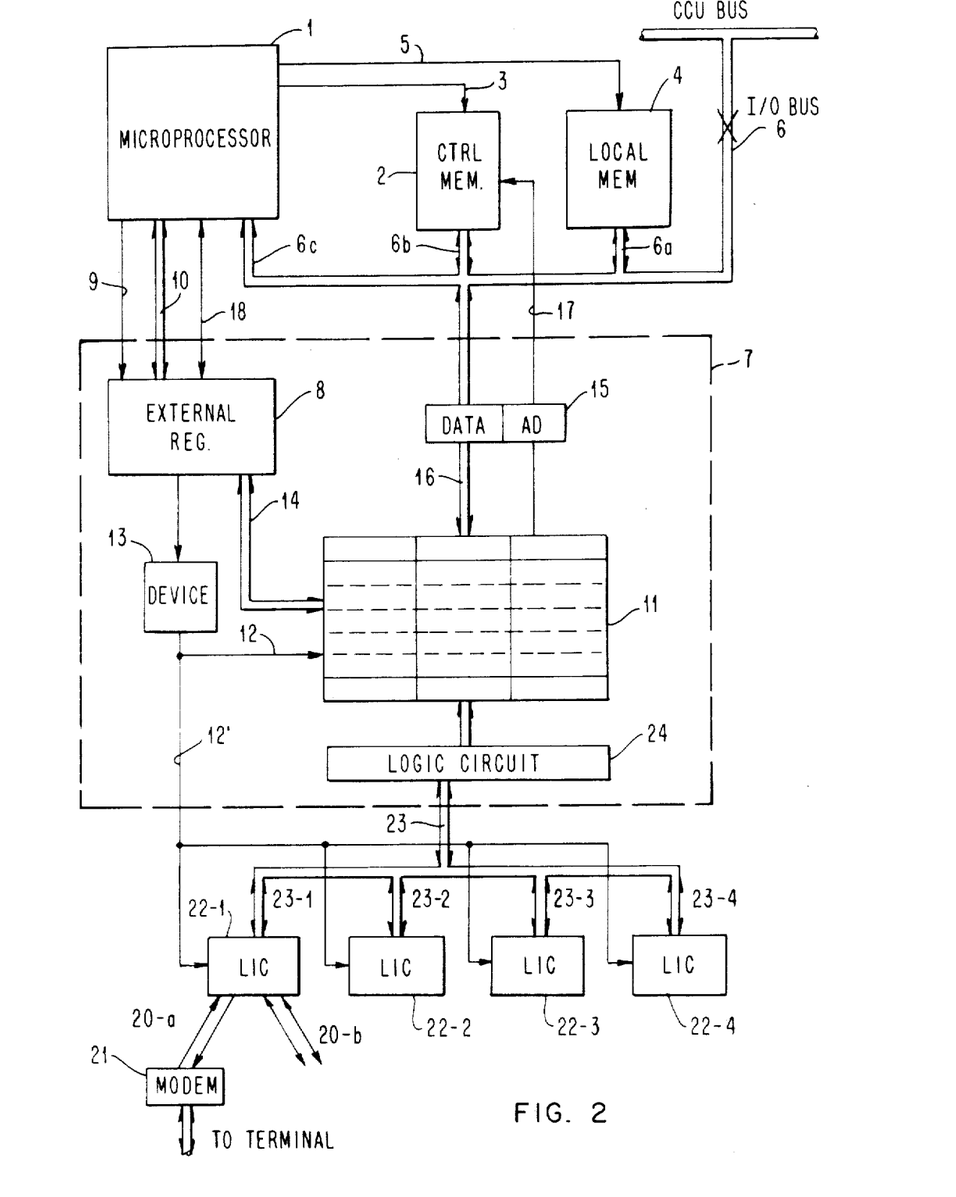
FIG. 2 is a schematic diagram of a line adapter according to this invention.

FIG. 2 is a schematic diagram of a line adapter according to this invention. It is comprised of a microprocessor 1 associated with a control memory 2 having therein a first area for storing microprocessor control microcode and another area for storing data. The control memory 2 is addressed by the microprocessor 1 through addressing path 3. The microprocessor 1 is also associated with a local memory 4, which is addressed through the addressing path 5. An input/output (I/0) bus 6 ensures the transit of the information between the CCU bus of the teleprocessing system and the line adapter by means of program-initiated operations (PIO) and adapter-initiated operations (AIO). Bus 6 is connected to local memory 4 via bus 6a, to the control memory via bus 6b, and to the microprocessor 1 via bus 6c.

A line scanner 7 is connected to the microprocessor/memories assembly. The microprocessor 1 can communicate with scanner 7 through writing or reading operations into or out of external registers 8 via bus 10.

A random access memory 11 is divided into several zones, each zone being associated with a communication line. This memory is addressed via path 12 by access selection device 13. As will be seen in the following description, the addresses are either forced by the contents of the external registers 8 or set by device 13 in order to control the line scanning operation. Bus 14 makes it possible to transfer information between the external registers and the memory 11.

Memory 11 communicates with control memory 2 of the microprocessor in the well-known "cycle steal" mode in order to exchange information between a zone in memory 11 selected by device 13 and a position of the control memory 2 selected by the address information in an input/output register 15 which is comprised of an address portion and a data portion. The data is exchanged through bus 16 and the memory is addressed through path 17. An interrupt path 18 is also provided in order to furnish an interrupt signal to the microprocessor 1 under conditions indicated by the contents of one of the external registers.

The adapter is connected to communication links with any one link having two lines 20a and 20b for fullduplex operation or one line for half-duplex operation. The link or links carry information to or from terminals, via modems 21 where necessary. Line interfacing circuits (LIC) 22-1 through 22-4 are arranged between scanner 7 and the lines. These interfacing circuits are connected to memory 11, through buses 23-1 through 23-4, respectively. The LIC circuits include line drive and receive circuit and registers to temporarily store data bits received from or to be transmitted to the lines to which they are connected. The registers are addressed under the control of device 13, through addressing path 12'.

Since the interfacing circuits LIC process the information in series form, and since scanner 7 and the microprocessor 1 operate with 8-bit bytes (which, in the following description, will merely be referred to as "bytes"), a logic circuit 24 is provided on bus 23 in order to ensure the serialization of the data in the transmission mode and the deserialization of the data in the reception mode, as well as other logic functions related to the memories.

Data can be received or transmitted according to different protocols, such as for instance, in SDLC (Synchronous Data Link Control), in BSC (Binary Synchronous Communication) and in S/S (Start/Stop). For each of these different protocols, transmission parameters such as lengths of the characters for the S/S and BSC protocols, length of the stop code for the S/S protocol, lengths and types of the control characters CRC, etc., should be defined. An example of the definition of the characters will be given further on.

Communication between the scanner 7 and the microprocessor 1 is carried out in two modes; an asynchronous mode which implies the operation of the microcode in control memory 2 and a synchronous mode independent of the microcode.

The asynchronous mode is utilized for three types of operations.

1 - INITIALIZING PHASE

The initializing phase is the phase during which the definition of a teleprocessing network takes place. As the system is set in the initializing mode, the characterizing parameters for each line of the network are stored in memory 11, under the control of the microcode through a procedure which will be disclosed later. To this end, the characterizing parameters are loaded into particular zones in the memory 11 via the external registers 8. The remaining zones are intended for the storage of data, the control parameters and status information thereof which indicate that an exchange of data is terminated. During the initializing phase, the memory assembly 11 is personalized with respect to the configuration.

2 - HANDLING OF THE MODEM INTERFACING LEADS

Interfacing leads (not shown in FIG. 2) are associated with lines 20a, 20b, and carry communication control signals. In order to process the control signals on these leads, a high degree of flexibility is required so as to handle the different types of modems and procedures which are known at present or which might be developed in the future.

The control information intended for the modem is sent by the microcode in the asynchronous mode, through paths 10 and 9 and registers 8 and is also stored in a so-called "modem-out" register. Each time the corresponding line is scanned, the configuration on these leads is compared with the configuration on the line drive circuit which is obtained through local receiving circuits, by means of a mask determined by the microcode. In the case where the two configurations do not match, a "drive circuit check" error condition is generated. In this way, the drive circuits of the addressed modem are checked.

During each scanning period, the information on the lead coming from the modem is stored in a "modem-in" register and is compared with the "modem-in" information stored in the corresponding zone of memory 11. This compare operation is started by the microcode and is carried out by means of a mask determined by the microcode. If the two configurations do not match, an interrupt request is generated and the comparison is interrrupted until the microcode starts another try. This prevents several interruptions from occurring in the case of a permanent change on the control leads of the modem due to erratic error conditions.

3 - PROCESSING OF INTERRUPT REQUEST

A synchronous mode is utilized for cycle steal-type information transfer directly into the control memory 2 of the microprocessor, through path 16 and register 15. The associated information (data, control parameters, status information) is transferred from and into control memory 2 with no microcode intervention.

The portion of control memory 2 which is reserved for this purpose is divided into memory zones LIB with one zone being assigned to each line.

A cycle steal data exchange is a well-known operation and is carried out through controls generated from microprocessor 1. Scanner 7 can have access to control memory 2 when the microprocessor 1 has answered a cycle steal request with a "granted cycle steal" signal. Then, the zone address in memory 2 where the transfer operation is to take place is supplied to the address portion of register 15. Memory 2 addressng is carried out through path 17, and data transfer, through bus 16.

Figure 3:
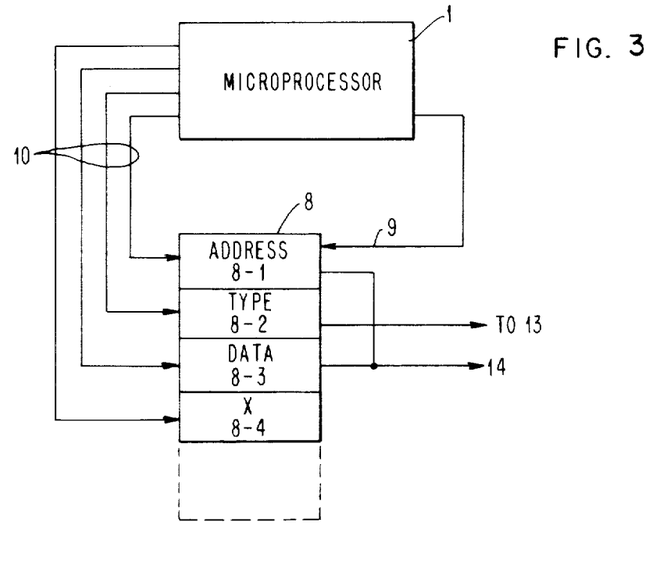
FIG. 3 illustrates the external registers utilized in the asynchronous initiating operation.

With reference to FIG. 3, there will now be disclosed how the initializing operation is carried out. In this operating mode, the microprocessor 1 transfers the initializing mode (information previously supplied to the microprocessor by the central control unit CCU) to scanner 7, by writing instructions into the external registers.

For this operation, four external registers 8-1, 8-2, 8-3 and 8-4 are necessary. The microcode loads the line address (20-a, for instance) into register 8-1, which starts the initializing operation. Each of the lines which will possibly be operated is identified in succession, according to the same procedure.

The address of the position in memory 11 wherein the initiating parameters should be written is loaded into register 8-2 under the control of microcode. The initializing parameters themselves are loaded into register 8-3.

Examples of initializing parameter formats are as follows. It is obvious that should other protocols or transmission modes happen to be utilized, other parameters could be defined.

Each parameter is comprised of 8 bits, from 0 to 7. When the line is a transmission line (such as line 20b), bits 0 through 7 can be encoded as follows.

| Bits 0, 1, 2 | |
|---|---|
| 1 0 1 | line S/S |
| 1 1 0 | line SDLC without interruption at first flag |
| 1 1 1 | line SDLC with interruption at first flag |
| 1 0 0 | line BSD controlled by code |
| 0 0 . | line BSC/ASCII (ASCII = American National Standard Code for Information Interchange) |
| 0 1 . | line BSC/EBCDIC |

BIT 3

This bit is not utilized in modes S/S and SDLC. In mode BSC, it is utilized as follows

| BSC | thru code: standard interface type X21 when bit 3 is 1 |
|---|---|
| BSC | ASCII/EBCDIC bit 3 should be taken into consideration together with bit 2 |
| 0 0 | character ITB (end of intermediate block) is not a control character |
| 1 0 | mode EIB (error information block) |
| 0 1 | mode ITB |
| 1 1 | mode EIB + change of block |

BIT 4

According to the protocol, this bit is meant for

| S/S | stop code length 0 = one bit 1 = two bits |
|---|---|
| SDLC | code NRZl when equal to 1 |
| BSC | thru code: unused |
| BSC | ASCII/EBCDIC bit 4 should be taken into consideration together with the following bit. |

BIT 5

| BSC | thru code: when 1 is meant for mono SYNC |
|---|---|
| BSC | ASCII/EBCDIC together with bit 4, is indicative of the type of the error control. |
| 1 0 | CRC S (CRC = Cyclic Redundancy Checking) |
| 0 1 | CRC B |
| 0 0 | CRC B or S/STX considered in CRC |
| 1 1 | Longitudinal Redundancy Checking (LRC)/Vertical Redundancy Checking (VRC) | bit is not utilized for protocols S/S and SDLC. For protocol BSC, it is utilized as follows:

BITS 6 and 7

For protocols S/S, BSC thru code, these two bits give the character length:

| 0 0 | 5 bits/character |
|---|---|
| 0 1 | 6 bits/character |
| 1 0 | 7 bits/character |
| 1 1 | 8 bits/character |

When the line is a receiving line, the definition of the bits is the same as previously.

For S/S protocols, the start and stop bits are not taken into account in the definition of the character length as they are removed from the bit burst sent by the terminal in order to receive data characters only.

In addition, for a BSC receiving line, the character configuration should be provided, and for a BSC transmitting line the configuration of the synchronization character to be inserted each second, should be provided.

Since the control memory 2 is split into memory zones LIB associated with each line for storing temporarily the data involved in the cycle-steal exchange operation, a start address should also be provided which determines which memory zone LIB is assigned to the line. This address format will be given later when the arrangement of the memory zones LIB in memory 2 is disclosed.

The data exchanges are carried out in bytes (8 bits, as defined above). An additional external register 8-4 is utilized in order to know the end and the result of the exchange.

One bit (bit X) of this external register 8-4 is handled by the scanner in the following way:

It is set to 1 when register 8-2 is loaded and it is reset to 0 when a new exchange can take place relative to a new line, and that the data is placed in the right position.

Figure 4:
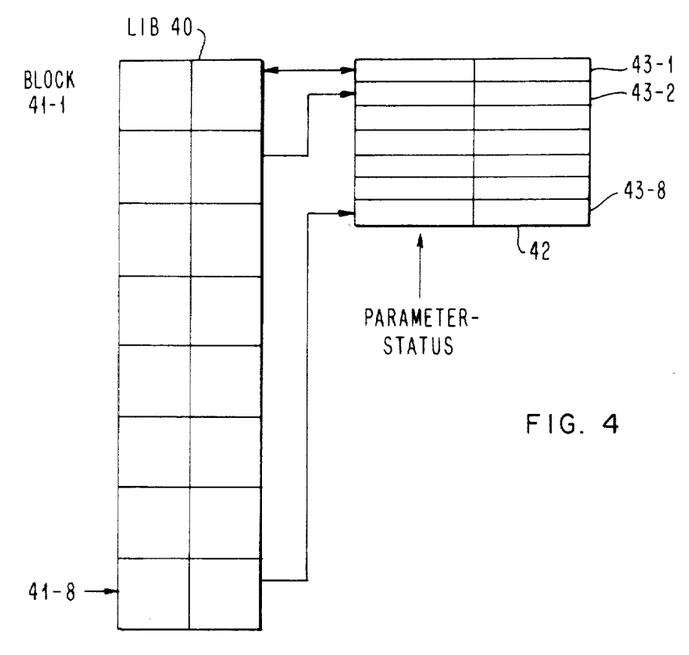
FIG. 4 illustrates the arrangement of a memory zone LIB and of the "parameter-status" zone which is associated therewith in the control memory of the microprocessor.

In reference to FIG. 4, there will be disclosed that portion of control memory 2 which is reserved for the cycle-steal data exchange through the path including bus 16 and register 15 in FIG. 2.

Memory 2 is split into memory zones LIB such as zone 40, in FIG. 4. One zone LIB is assigned to each communication line. In memory 2, there are as many zones LIB as there are lines handled by the adapter.

Because of the structure of the data, zones LIB are divided into 8-byte bursts. For SDLC and BSC protocols, the data is preceded and followed with padding characters (pad) and control characters. In SDLC data reception mode, several frames can be received and the data should be exchanged separately in order to identify such frames. That is why zones LIB 40 are subdivided into bursts 41. Zone 40 is shown as being divided into 8 bursts 41-1 through 41-8. A complete burst can be transferred without interruption of the microcode.

A "parameters-status" memory zone is associated with each zone LIB and is utilized to store the status information and control parameters. A block 43 in zone 42 is assigned to burst 41, burst 41-1 is associated with burst 43-1 and burst 41-8 is associated with burst 43-8, for instance. With each burst 43 it is possible to store two bytes.

Before making use of a burst, the associated control parameters (the definition of which will be given further on) are transferred into the appropriate zone 43 by the microcode. When a data burst has been processed, the status information is transferred into burst 43 by scanner 7, where it replaces the parameters.

The microcode is interrupted after a data burst has been processed only when required by the parameters. Thus, the message can be sent with only one interruption at the end of the message or else the microcode is interrupted only when a predetermined quantity of data has been processed by scanner 7 in order to fetch additional data from or send it to the central unit CCU.

In reception mode, a message is terminated when the ending control character is detected. The ending information is status information. In BSC mode, the microcode checks the last character in the burst in order to identify the ending character (ETB, ETX, ENQ).

The storage capacity of zones LIB can be determined in terms of the protocol of the corresponding line, the sizes of the messages and the speed of the line. The size of a zone LIB can vary from 64 to 256 bytes and the storage capacity of one burst can vary from 1 to 8 bytes.

The different zones LIB are assigned to each line during the initiating mode by means of the "start address" data which is written in memory 11. Such data is of the following format.

The first two bits give the length of zone LIB in number of bursts. The following bit, when reset to 0, indicates that the address of a zone LIB is concerned. In order to proceed to the "parameters-status" zone 42, the bit is set to 1. The remaining bits are address bits.

Such start address information is utilized to begin addressing memory 2 through path 17 and to identify the memory positions where the cycle-steal transfer operations should be carried out.

The controls are sent to scanner 7 by the control microcode in order to start or stop the transmission of the data on a "transmitting" line, such as, for instance, 20-b, or the reception of the data on a receiving line, such as, for instance, 20-a. The controls are sent to the appropriate line through the asynchronous path including the external registers 8 and bus 10 and by sending the control parameters to memory 11.

There will now be given, by way of a non-limiting example, a definition of the status information and parameter fields which can be utilized.

DEFINITION OF THE PARAMETER FIELD

"Transmitting" Line

This field is comprised of 16 bits, the meanings for which are:

| | |
|---|---|
| Bit 0 | Valid burst (the burst can be transmitted). This bit is indicative that the associated data burst contains the data to be sent. It is reset to zero by the control microcode and set to 1 by the scanner when the status information is exchanged. |
| Bit 0 | = 0 valid burst. |
| Bit 0 | = 1 non-valid burst. |
| Bit 1 | Start data transmission. |
| Bit 2 | Interruption required. This bit forces scanner 7 to ask for an interruption, through an external register and line 18 when the last character in the burst has been sent into the appropriate position in memory 11 which corresponds to the line. |
| Bits 3,4 | Not used. |
| Bits 5, 6, 7 | Count of data bytes in the burst. These bits are indicative of the number of the bytes to be taken from this burst (from 1 to 8 bytes from the beginning of the burst). |
| Bit 8 | Send CRC (valid for protocol SDLC). This bit is indicative that at the end of the data burst, the accumulated CRC (error control mode CRC: Cyclic Redundancy Checking) should be sent. |
| Bit 9 | Start on odd byte. When this bit is set to 1, the scanner acts as if the first byte (byte 0) of the burst had already been processed. (This makes it possible to start with the second byte: byte 1, odd). |
| Bit 10 | Not used. |
| Bits 11, 12 | When "00" - intermediate data. When "01" - last data, end of message EOM. In that case, scanner 7 sends the complete burst. When the last bit of the last character to be sent has been transmitted to the modem, device 7 interrupts the control code and stops the transmission (EOT). When "10" - these data should be transmitted continuously (wrapping). When the last data in the burst has been read, the scanner comes back to the first data. When "11" - end of the message with turnaround same operation as previously (01) but the line is automatically set in start receive mode at time EOT (end of transmission). |
| Bit 13 | Either no zero insertion into this data, no accumulation CRC (SDLC) or interrupted transmission (S/S). This bit requires that scanner 7 does not perform the zero insertion for all the data bytes within this burst. |
| Bit 14 | Start of timer. |
| Bit 15 | Send the contents of "modem-out" register at the end of the burst. |

"Receiving" line

Only eight bits are utilized in the control parameter field.

| Bit 0 | Valid burst. Burst ready to receive data which can be sent by device 7. It is reset to zero by the control microcode and set to 1 by the scanner when the status information is exchanged. |
|---|---|
| Bit 0 | = 0 valid burst. |
| Bit 0 | = 1 non-valid burst. |
| Bit 1 | Start data reception. |
| Bit 2 | Ask for an interrupt request at the end of the burst. |
| Bits 3,4 | Not used. |
| Bits 5, 6, 7 | Count of bytes to be put in this burst. |

DEFINITION OF THE STATUS INFORMATION FIELD

"Transmitting" line

| Bit 0 | = 1 valid burst. This bit means that the data contained in this burst has been sent and that the burst can be re-utilized by the control microcode in order to insert other data. |
|---|---|
| Bit 2 | An interruption was required by the control code (via parameters). |
| Bits 3,4 | Not used. |
| Bits 5, 6, 7 | Count of transmitted data. |
| Bits 8,9 | Not used. |
| Bit 10 | Underrun. |
| Bit 11 | Change of the contents of the "modem-in" register. This bit is indicative that a change in the contents of the "modem-in" register has occurred during the processing of this burst. Status data is immediately sent and an interruption is immediately required. |
| Bit 12 | = EOT (end of transmission). This bit is set to 1 when the scanner 7 has processed a burst with an end-of-message information (EOM) in the corresponding parameter field. |

"Receiving" line

| Bit 0 | Valid burst. The scanner 7 sets this bit to 1 when the status information is cycle stolen in order to notify the control code that the associated burst has been filled. The data can be utilized by the control microcode. |
|---|---|
| Bit 1 | Not used. |
| Bit 2 | An interruption has been required by the control code, through parameters. |
| Bits 3,4 | Not used. |
| Bits 5, 6, 7 | Count of the data received in this data burst. |
| Bits 8, 12 & 13 | When 000 - intermediate data. When 001 - end of reception with non-checking error CRC. When 101 - end of reception with checking error CRC. When 011 - flag off boundary. When 100 - abort (the started message is wrong, should not be taken into consideration. When 110 - Idle state (the line has been restored to an idle condition). |
| Bits 9, 10 | When 10 - normal service. When 11 - lost character (overrun). |

Zones LIB 40 are utilized to stack the data being transmitted between the control unit CCU and the scanner 7 in order to avoid the character overrun and character request conditions and to regulate the streams of data on the line.

For an operation on the transmitting line, the data should be transferred from the control unit CCU to the scanner into the memory 11 zone and to the line. Conversely, for a reception operation, the data should be transferred from the receiving line into the memory 11 zone associated with the line, and then to the unit CCU.

The data, then, are fetched from the unit CCU into the appropriate zone LIB (transmission operation) or fetched from the zones LIB into the unit CCU (reception operation) 16 butes at a time, by adapter-initiated operations AIO (control microcode).

The data is read and transferred from zones LIB into memory 11 (transmission operation) or from memory 11 into zones LIB (reception operation) two bytes at a time by scanner-initiated cycle steal operations.

For each data burst exchanged between a zone LIB and memory 11, the two corresponding parameter bytes give memory 11 information relative to the data in that burst or the data to be inserted into that burst, which action should be performed by the scanner at the end of the burst, such as, for instance, microcode interruption,

. . . .

The end-of-burst condition allows scanner 7 to transfer the two status information bytes which replace the two parameter bytes associated with this burst and to interrupt the microcode, when necessary.

Interrupt requests are made either by the microcode, through the parameters, or by scanner 7 when abnormal end-of-data transfer conditions occur.

Figure 5:
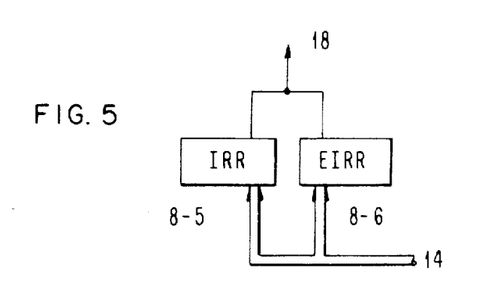
FIG. 5 illustrates the external registers which are utilized in the interrupt request procedure.

To this end, two registers are provided in external registers 8. These registers are schematically shown in FIG. 5. Scanner 7 identifies and sends the address of the line for which the interrupt request has been made into the external interrupt request register IRR 8-5 and the reason why there is such an interrupt request, either into register IRR 8-5 or into register EIRR 8-6.

Figure 6:
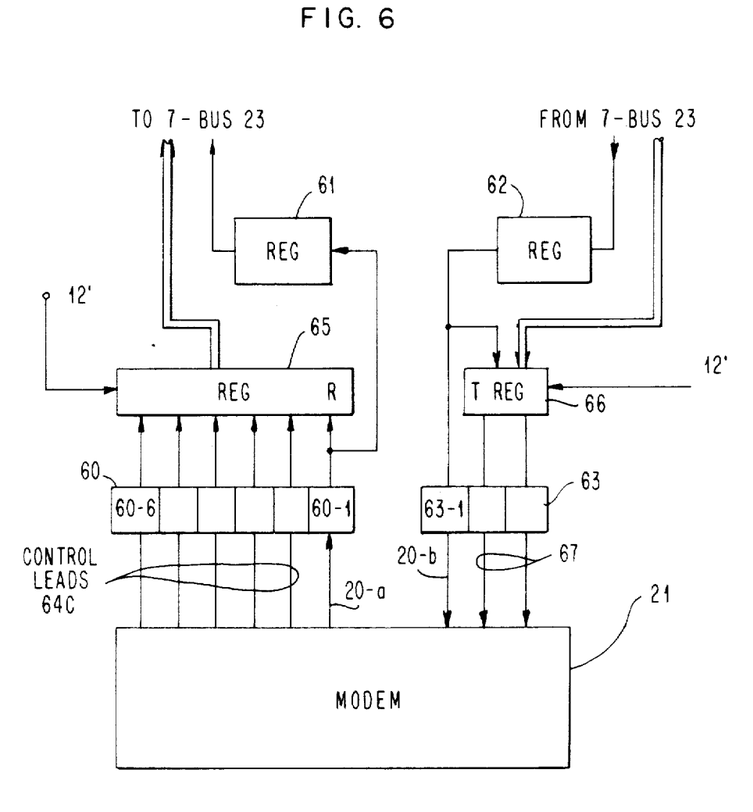
FIG. 6 illustrates the interface circuit elements of the lines associated with a communication line.

In reference to FIG. 6, there will now be disclosed the way how the information present on the control leads associated with the transmitting and receiving lines 20-b and 20-a, respectively, is handled. The elements shown in FIG. 6 are utilized to handle a reception-transmission line in connection with modem 21. Consequently, in a circuit LIC, there are as many elements as there are lines connected therewith.

Some of these leads transmit the control information coming from the modem and some others transmit information to the modem. The meaning of these pieces of information depends on the type of the standard interface utilized, such as, for instance, CCITT V24 or V25.

Therefore, there are two types of control information. The first type is "information-in" from the modem and the second type is "information-out" to the modem.

The signals received on line 20-a are transmitted to a receiver 60-1 in an assembly of circuits 60. One receiver is associated with the line and with each control lead. The signals are then sent to scanner 7, over bus 23, through register REG 61. The signals to be transmitted on line 20-b are received from memory 11, through bus 23. They are stored in an intermediate register REG 62 and sent over the line, by a drive circuit 63-1 in a circuit assembly 63, a drive circuit being associated with the line and with each control lead.

The information on the control lead from modem 12 is stored in a "modem-in" register 65. This register can be addressed by line 12' in the same way as a memory position. The scanner fetches out the information contained in this register each time the line is scanned and stores it in the portion of memory 11 associated with this line in order to detect the status changes of the control leads according to the code supplied by the microprocessor, through masking configurations.

Conversely, the information to be transmitted to a modem is generated by the microcode and stored in a "modem-out" memory 11 position associated with this line, through the asynchronous paths 9, 10 and the external registers 8. When the line is scanned, logic circuit 24 transfers the "modem-out" data to the "modem-out" register 66. The "modem-out information" control leads 67 come from the output of register 66.

The "modem-in" information is processed as follows. In memory 11, two bytes per line are reserved for the "modem-in" configuration and the "modem-in" control. The control byte is generated by the control code so that the scanner can know how to deal with the "modem-in" data changes.

"Modem-in" Configuration bits 0 through 5

According to the control byte (mask), all the bits of the configuration can be controlled in order to find out a possible change, but only the first three bits have an effect upon the operation of scanner 7, namely:

| Bit 0 | Data set ready. |
|---|---|
| Bit 1 | Clear to send. |
| Bit 2 | Tone indicator. |
| Bits 3,4 | Tansparent for scanner 7. |
| Bit 5 | Receiving line bit which is used by the code as an indicator when a change occurs. Generally, this bit is masked by the code. |

"Modem-in" control bits 8 through 13

In logic device 24, the incoming "modem-in" data should be compared with the previously stored configuration in order to detect any change. The microcode can control a bit comparison, selectively by loading a masking configuration into bits 8 through 13. Such a configuration is subject to an AND operation with the first six "modem-in" data bits.

When a change has been detected, the microprocessor is notified of it. The "modem-out" data is processed as follows:

In memory 11, three bytes are allocated per line to the "modem-out" configurations.

Two bytes of the (stacked/immediate) "Modem-out" Configurations.

These two configurations are transferred to the appropriate circuits LIC 22 with no modification from device 7. They are given by the control code through the asynchronous paths 9, 10 and external registers 8.

"Modem-out" Service Request, bits 6 and 7 of the Configurations.

When these bits are 0, this causes the "modem-out" configurations to be sent to the addressed line. These controls are set by the microcode, through the asynchronous path after the "modem-out" configuration has been loaded through this very path.

The difference between the two controls is that the logic device 24 causes the "modem-out" configuration to be sent immediately as the line is scanned and causes the stacked "modem-out" configuration to be sent only when requested by the microcode at the end of the sending of the data burst when required in the associated parameters.

One Byte, Checking Mask of the Drive Circuits

When positioning the bits of this mask, in an appropriate manner, checking of some drive circuits, is inhibited.

Figure 7:
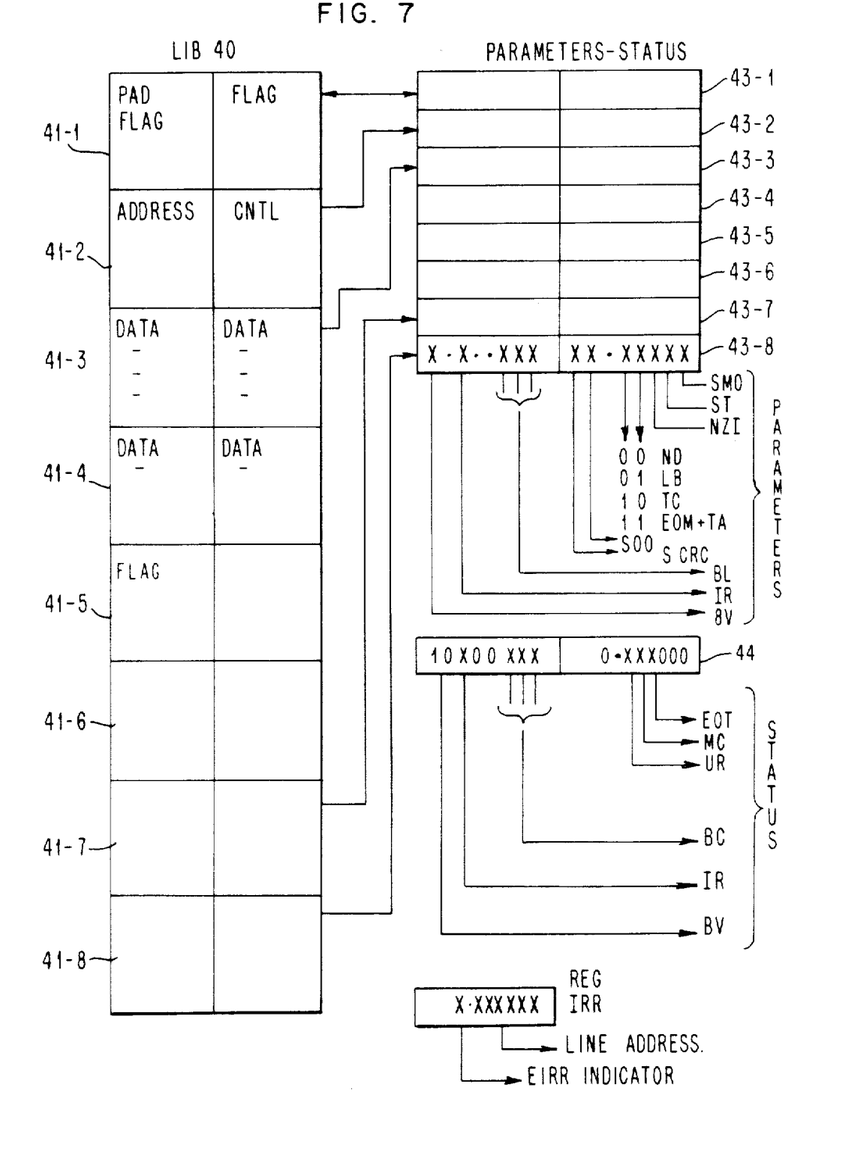
FIG. 7 illustrates the contents of a memory zone and of its associated "parameter-status" zone for a transmission operation.

There will now be disclosed, by way of a non-limiting example, how a transmission operation takes place on a line. In the chosen example, the transmission mode on the line is SDLC. Reference should be made to FIG. 7 which illustrates the contents of the associated zone LIB 40 and the contents of the "parameterstatus" zone 42. In this figure, the references are the same as those utilized in FIG. 4.

A zone LIB, which is utilized as a buffer between the central processing units and the scanner 7, is allocated to the line on which the operation will be carried out.

A field in the "Parameters-status" zone is associated with each burst of zone LIB, as disclosed previously with reference to FIG. 4. This field is utilized in transmission mode in order to give information to scanner 7. The parameter information is replaced with the status information given by the scanner after the end of transmission of the burst.

The parameter field is comprised of 16 bits which are the indicators shown in FIG. 7 in the last zone 43-8.

The indicators mean:

| Bit 0 | BV (valid burst). When reset to zero, it indicates to the scanner that the corresponding parameter field burst is ready to be handled by the scanner for a data transmission (1: burst is empty; 0: burst is full). |
|---|---|
| Bit 1 | Not used. |
| Bit 2 | IR (Interruption requested). When the scanner has transmitted the burst, it requires an interruption of the microprocessor with indicator IR = 1 in the corresponding status field. |
| Bits 3,4 | Not used. |
| Bits 5, 6, 7 | BL (burst length) is indicative of the number of the characters defined in the burst which are to be transmitted on the line (1 through 8 bytes). |
| Bit 8 | S CRC (send CRC) the two characters FCS (FCS = Frame Check Sequence) should be sent after sending the data of the involved burst. |
| Bit 9 | S 0 0 (Start on Odd Byte). The first byte in the burst is not transmitted on the line. |
| Bit 10 | Not used. |
| Bits 11; 12 | ND (normal data when 00). LB (last burst when 01). Last burst to be transmitted. After the end of transmission, this indicator will cause scanner 7 to ask for an interrupt request in order to inform the microprocessor that the message has been sent (status information, bit EOT) (end of transmission) set to 1. TC (continuous transmission). When 10, go on transmitting the characters defined in this burst. EOM + TA (end of message + turnaround). |
| Bit 13 | NZI (No Zero Insertion). Remove the insertion of bit zero after sending of 5 consecutive bits 1 on line used to send the flags and pads. When this bit is 1, CRC is not accumulated. |
| Bit 14 | ST (Start Timer). Activates a timer in scanner 7. At the end of the time-out, an interruption is required of the microprocessor. |
| Bit 15 | SMO (send modem-out). The stacked "modem-out" information is sent into register 66 of circuit LIC corresponding to the end of transmission of the burst. |

The status field shown by 44 in FIG. 7 contains the indicators associated with the completion of a transmitted burst:

| Bit 0 | BV (valid burst). |
|---|---|
| Bits 1,2 | Not used. |
| Bit 3 | IR is set to 1 when IR in the parameter field was set to 1. |
| Bit 4 | Not used. |
| Bits 5, 6, 7 | BC (Byte Count) is indicative of the number of the characters which have been transmitted in this burst (1 through 8 bytes). |
| Bits 8,9 | Not used. |
| Bit 10 | UR (underrun) is set to 1 when the scanner is transmitting the corresponding burst but finds indicator BV set to 1. |
| Bit 11 | (Modem Change) indicates the status of the modem lead has changed during transmission of the character. |
| Bit 12 | EOT (end of transmission) is set to 1 when indicator LB (last burst) was set to 1 in the parameter field. |

The external register IRR (interrupt request register contains:
indicator EIRR and
the line address.

BEGINNING OF A FRAME

The beginning of each of the SDLC frames is built by the control code, as follows:

The first burst 41-1 is filled in terms of the initiating parameters, such as, for instance, pad/pad/flag. The corresponding parameter field 43-1 is:
valid burst indicator BV reset to 0.
burst length indicator BL is indicative of the number of pads and flags contained in the burst.
NZI indicator set to 1.

The second burst, burst 41-2, is filled with the address and control characters given in the transmission control parameters sent by the central processing units. The corresponding parameter field 43-2 is:
indicator BV reset to 0
indicator BL

DATA WITHIN A FRAME

When the frame contains no data, skip to END OF FRAME.

The control code transfers sixteen data bytes from the central processing units into the third and fourth bursts.

The corresponding parameter fields are:
BV set to 0
BL is indicative of the number of bytes.

The two following bursts are filled in. The parameter field data is constructed in the same manner and this operation is carried out until all the bursts are filled in. If the data happens to be still transmitted, indicator IR (interruption request indicator) is set to 1 at the end of every other burst, bursts 41-2, 41-4, 41-6, 41-8. When the bursts are filled with data ready to be transmitted, the control code initiates an asynchronous output operation "TRANSMIT OUT" in the scanner.

The scanner performs a cycle steal operation in order to obtain the parameter field associated with the burst to be transmitted. The data bytes are transferred from the bursts to memory 11.

Once two bursts have been transmitted over the line, the scanner proceeds to request an interruption of the microprocessor. The result of the burst transmission operation is set into the "status" field in the place of the preceding parameters. Then, the control code proceeds as follows:

Checking of the status field. The indicator BV has been set to 1 by the scanner.

The identified line in register IRR is set in pending condition so that sixteen additional data bytes can be inserted into the two bursts which have been emptied.

Once these two bursts are filled anew, when the following two bursts are empty (BV=1), the control code causes sixteen bytes to be transferred into these bursts so that the bursts are always filled with the maximum of data.

END OF A FRAME

The end of each of the SDLC messages is built by the control code, as follows:
an indicator SCRC (sending of CRC) of the last filled burst should be built,
the following burst should be filled in with pads and flags according to the initiating mode parameters,
the corresponding parameter field should be built:

| BV = | 0 |
|---|---|
| BL = | number of the pads and flags in the burst, |
| NZI = | 1 |
| TC = | 10, when necessary or: indicator EOM = 01, will cause the scanner to request interruption of the microprocessor when the message has been transmitted. The control code will answer by taking the necessary actions, namely, either send the status information relative to the end of the transmission operation back to the central control unit (CCU) or wait for the answer required from the line, in the case the line was half-duplex, (indicator EOM = 11) before requesting an interruption of the control unit (CCU) for the concerned line. |

Figure 8:
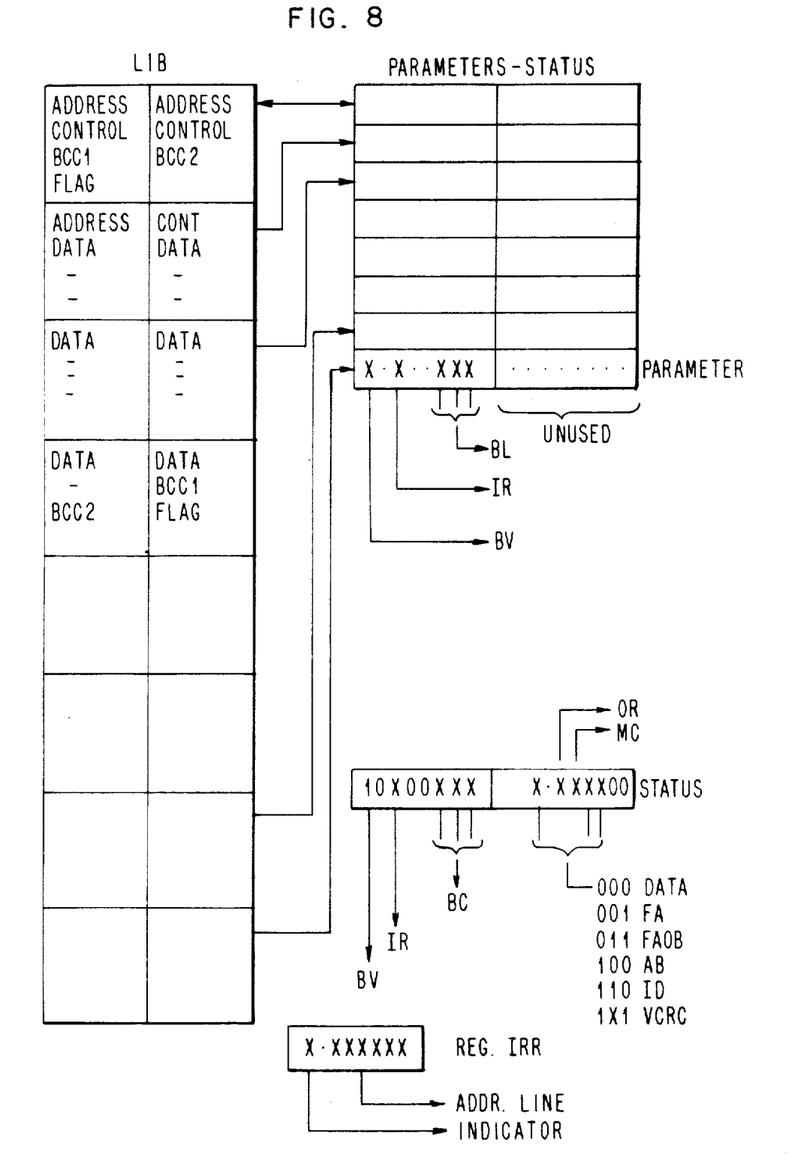
FIG. 8 illustrates the contents of a memory zone and of its associated "parameter-status" zone for a reception operation.

INTERRUPTION required by the scanner
Indicator IR=1
Change on the modem leads
Characters are missing
End of message
Time out
Hardware error With reference to FIG. 8, there will now be disclosed the SDLC data reception operation. Thus, the data is received on line 20-a and sent into memory 11; thereupon, it should be cycle steal transferred into a corresponding memory zone LIB.

In receive operation, the control parameter fields should be initiated with the following information:

| indicator BV | 1: filled burst. 0: empty burst. |
|---|---|
| indicator IR | Set to 1, every other burst. |
| indicator BL | The number of the bytes that the scanner will insert into each burst. |

The status field contains the following indicators:

| Indicator BV | Set to 1 by the scanner, reset to 0 by |
|---|---|

-continued the control code.

When set to 1:
notifies the control code that the burst contains data to be handled;
notifies the scanner that the data contained in this burst are not handled yet; the scanner cannot insert data any more, the "overrun" condition is reported, the rest of the received data is rejected.

When reset to 0:
notifies the control code that data is not yet available in this burst.
notifies the scanner that the burst is ready to receive the data.

| | |
|---|---|
| Indicator OR | (overrun) is set to 1 when the scanner desires to fill - in a burst and that BV is still set to 1. |
| Indicator IR | is set to 1 when required by the parameter. |
| BC | Number of the bytes in the burst. |
| FA | The ending flag has been detected on the line. |
| FA O B | (flag off boundary) an undefined flag has been detected on the line. |
| AB | (abort) condition AB has been detected on the line. |
| ID | (idle status) condition ID has been detected. |
| VCRC | (checking CRC): The CRC calculated by the scanner is not correct. |
| MC | (modem change): The status of the control leads have changed for this line, during the reception operation. |

BEGINNING OF A FRAME

The control code initiates an asynchronous reception operation to the scanner. Once a first flag has been detected by the scanner, the characters which are not additional flags start filling the first available burst through a cycle steal operation.

DATA WITHIN A FRAME

When the frame does not contain Control and Address Character data, skip to End of Frame. In the opposite case, the control code proceeds to the following operations:
  The following characters received in the same burst and in the following bursts are data which should be transferred to the central processing unit, sixteen bytes at a time.
  The indicator IR will cause the control code to set the line identified in register IRR pending in the queue of the cycle steal operations in order to send this data to the central control unit (CCU).
  When two data bursts have been transferred to the central control unit, the control code resets indicator BV to zero in the associated parameter field. This bit is set to 1 by the scanner when the burst and status field are filled with the data and control information.
  The following two bursts are filled with data BV = 1→the line address should be set pending).

ENDING OF THE FRAME

At the end of a frame (a flag present in the status burst), once the data has entirely been sent, the ending status information is sent to the central control unit (CCU) and an interruption is required of the CCU for the concerned line. At this moment, the bursts may already be comprised of other frames waiting for controls from the central control unit.

INTERRUPTION

The scanner requires interruption of the microprocessor in the following conditions:
  Ending frame detected (flag, abort, idle status),
  Status of modem leads, changed,
  Overrun,
  Time out,
  Interruption required in the parameter frame,
  Hardware error.

It is clear that the preceding description has only been given as an example, and that numerous alternatives may be considered without departing from the spirit and scope of this invention.

Having thus desired my invention, what I claim as new, and desire to secure by Letters Patent is:

1. For use in a communications controller which controls the exchange of data between at least one central processing unit and terminals, a communication line adapter to which the terminals are attached through data lines, characterized in that said adapter includes:
   first means comprises a microprocessor and a control memory for storing data and the control code of the microprocessor;
   said means comprising an assembly of external registers, an address selection device, and a random access memory divided into zones which are addressed by means of the address selection device, each zone of said random access memory being assigned to a data line in order to store temporarily the data to be exchanged between the central processing unit and the terminals and control parameters when the zones are sequentially addressed by the address selection means, and
   third interface means comprising three paths between the first and second means said paths including
   a first asynchronous input/output path comprising a first bus connecting the microprocessor to the external register assembly, a second bus connecting the external register assembly and the random access memory, and an addressing line connecting the external register assembly to the address selection device, said first path being used during an initialization phase to address the random access memory zones by means of the microprocessor through the external register assembly controlling the address selection device, to assign each zone to a data line and to transfer intializing control parameters from the microprocessor control memory into the addressed random access memory zones,
   a second asynchronous path connecting the microrocessor to the random access memory through the external register assembly allowing interrupt requests to be sent to the microprocessor by the second means, and
   a third synchronous path comprising a data bus and an addressing bus connecting the random access memory to the microprocessor control memory for exchanging the data between the control memory and the random access memory through cycle steal operations, under the control of the address selection device which addresses sequentially the random access memory zones without any intervention of the microprocessor microcode.

2. An adapter according to claim 1 characterized in that the initializing parameters are represented by bit patterns specifying the data nature and the exchange protocol on the data lines.

3. An adapter according to claim 2 characterized in that the assembly of external registers in said second means includes at least four registers, said registers being loaded by means of the first asynchronous path, a first register being loaded by the microporcessor with the address of the line to be specified with the initializing control parameters, a second register being loaded by the microprocessor with the address of the random memory zone to be assigned to said line, a third register being loaded with the initializing control parameters and a fourth register being loaded with exchange control data; the contents of the first and second registers being utilized by the address selection device for addressing a random access memory zone and the contents of the third being transferred to the transferred to the addressed zone through the second bus of the first input/output path during the initializing phase for specifying the random access memory zones according to the data nature and the exchange protocol on the data lines assigned thereto.

4. An adapter according to claim 3, characterized in that the data storing portion of the control memory of the microprocessor is organized in zones with two zones assigned to each data line, the first zone being dedicated to the temporary storing of data to be transferred to or received from the access memory and the second zone being dedicated to the storage of status information and control parameters.

5. An adapter according to claim 4 characterized in that each data storing zone in the control memory is assigned to a line during the initializing phase through the microprocessor by writing a start address into the third register.

6. An adapter according to claim 5, characterized in that each data storing zone is split into eight byte bursts, a "parameter-status information" field being associated with each burst in the status information and parameter zone.

7. An adapter according to claim 6, characterized in that the control parameters for a transmitting line contain information which is characteristic of the information to be inserted into the associated burst.

8. An adapter according to claim 7, characterized in that the status information replaces the parameters at the end of a transmission or reception operation in order to indicate the result of said operation.

9. An adapter according to claim 7, further including at least one data line interfacing means arranged between the terminals and the second means of the line adapter, each interfacing means comprising drive circuits connected to transmitting lines used for sending the data from the central processing unit to the terminals, and reception circuits connected to receiving data lines used for sending the data from the terminals to the central processing unit and, transmit registers connected through an exchange bus to the second means of the adapter to receive the information to be transmitted by the drive circuits from the random access memory and receive registers which receive the information from the reception circuits in order to transmit it to the random access memory through the exchange bus.

10. An adapter according to claim 9 characterized in that the terminals are connected to the line interfacing means through a modem, said line interfacing means including a modem-in register for storing the information on the control leads associated with the receiving line and on the receiving line, and a modem-out register for storing the information to be directed on the control leads associated with the transmitting line and on the transmitting line, said registers being addressable by the microprocessor through the external register assembly controlling the address selection device and exchanging their contents with the random access memory zones assigned to said recieving and transmitting lines through the exchange bus.

* * * * *